Jan. 19, 1943.　　P. S. MARTIN　　2,308,701
POULTRY FEEDER SUPPORT
Filed Sept. 12, 1941
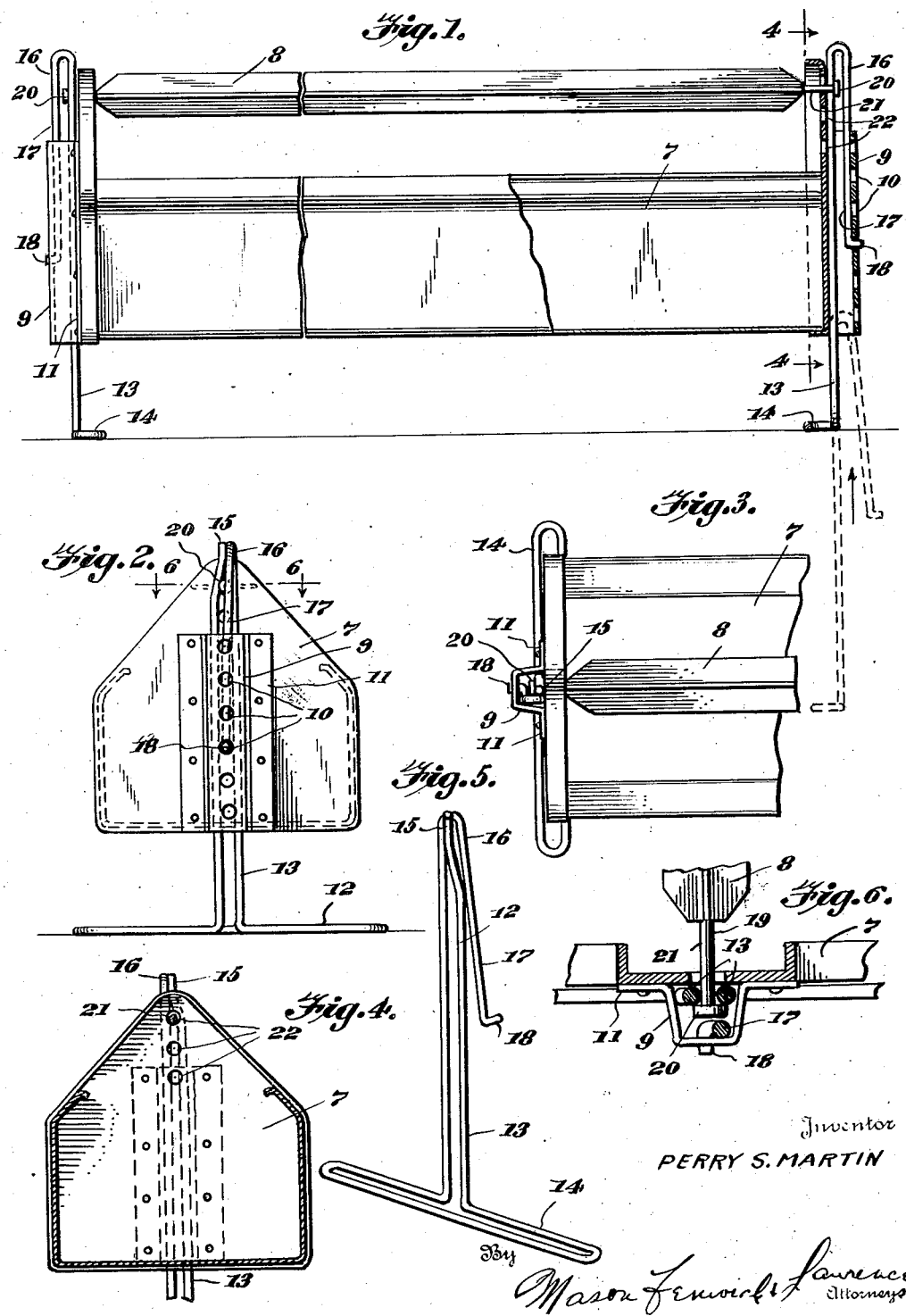
Inventor
PERRY S. MARTIN Patented Jan. 19, 1943

2,308,701

UNITED STATES PATENT OFFICE 2,308,701

POULTRY FEEDER SUPPORT

Perry S. Martin, Harrisonburg, Va., assignor to Shenandoah Equipment Corporation, Harrisonburg, Va.

Application September 12, 1941, Serial No. 410,638

6 Claims. (Cl. 119—61)

This invention relates to poultry feeders; and more particularly, the snap lock leg which acts as a support and permits the height of the feeder to be readily adjusted and the leg firmly held in place.

Most feeder legs are adjustable by means of a wing nut or bolt which are cumbersome and require time for adjustment. The principal object of my invention is to provide a simple, durable, adjustable support and leg for a poultry feeder which is free from nuts and bolts and can be quickly manipulated to provide adjustment.

Another object is to provide a leg support formed of a single piece of spring metal, a free end forming a snap lock for holding the poultry trough in adjusted position.

Still another object is to provide a snap lock support formed of a continuous piece of metal encased and slidably mounted in a socket, the socket carrying apertures to receive the end of the resilient locking member.

Other objects will be disclosed in the specification and claims forming a part of this application.

In the drawing:

Figure 1 is a vertical section of a poultry trough in which the trough portion is the usual construction, the improved resilient supports being shown;

Figure 2 is an end view in elevation;

Figure 3 is a fragmentary top view;

Figure 4 is a vertical section taken on the line 4—4 of Figure 1;

Figure 5 is a perspective detail of the resilient support and locking member; and Figure 6 is a detail of a horizontal section taken along the line 6—6 of Figure 2.

Referring to the drawing, in which similar parts are designated by like numerals:

Numeral 7 designates a poultry trough of the usual construction including a reel 8 or other suitable and equivalent guard to prevent chicks from entering the trough. On opposite ends of the trough 7 are formed sockets or brackets 9 having keeper apertures 10. The sockets 9 have flanges 11 which are spot-welded or riveted to the trough 7. Supports 12 are formed of resilient steel wire 13 or other material of continuous length, feet 14 being formed by bending the wire 13 to form loops and the two ends being extended upwardly substantially parallel to each other to form the support, the end 15 being secured to the opposite loop portion intermediate its ends, the loop end 16 being bent downwardly to form the locking member 17, the end forming a stud 18 adapted to enter the apertures 10 in the sockets 9. The reel 8 has a boss 19 at each end, the head 20 of which is larger than the shank 21. A plurality of holes 22 are formed at each end of the trough in line with and above each socket 9. The shank 21 is long enough to extend between the two arms of support 12 when the support is in position in the socket. Upon the supports 12 being positioned in the sockets 9, the boss at each end of the reel can be forced between the arms of the support, and, due to the resiliency of the arms of the support, the reel will be held firmly in position against accidental displacement but permitting rotation. The movement of the supports 12 in the sockets 9 will not interfere with the boss being held securely in place.

As actually used, the support 12 and locking member 17 are inserted in the socket 9 at each end of the trough, the locking member 17 being depressed so that the stud 18 will clear the bottom opening of the socket, and upon the locking member being released the resilient material of the locking member will cause the stud 18 to enter the desired aperture. It will be obvious that by depressing the locking member 17 the stud 18 will clear the aperture in which it is seated, and by turning the feet 14 imparting movement to the support 12, the stud 18 will be moved out of alignment with the apertures 10, and the support raised or lowered to a point opposite the desired aperture whereupon a slight rotation of the support will bring the stud into alignment with the desired aperture. This greatly facilitates the adjustment since it is not necessary to manually keep the stud depressed and prevents the stud seating in each aperture.

By having the supporting and locking members made of a continuous piece of metal operating within each socket, the maximum strength and efficiency of operation is obtained. The structure, however, may be modified by making the locking member 17 separately and welding or otherwise securing it to the support with substantially the same result. I prefer, however, the unitary structure illustrated in the drawing.

By having a unitary structure, the feet 14 formed from the body of the wire and the two end portions extending up through the socket 9, with end 15 secured at the top to the opposite wire and the other end turned down back through the socket 9 to form the locking member 17, a very compact structure is formed which always provides a tight frictional fit within the socket.

Numerous variations may doubtless be devised by persons skilled in the art without departing from the principles of my invention. I, therefore, desire no limitations to be imposed on my invention, except such as are indicated in the appended claims.

What I claim is:

1. A poultry feeder comprising a trough, support receiving members on said trough, and a support slidably mounted in each of said support receiving members, each support being formed of resilient material having base members with divided legs coming together at the top and one leg continuing beyond the point of joinder, and forming a resilient locking member extending into the adjacent support receiving member and in supporting engagement therewith.

2. A poultry feeder comprising a trough, a reel rotatably mounted on the top of said trough and having a boss at each end extending beyond the sides of the trough, each boss having a headed shank, the head being larger than the shank, support receiving members on said trough provided with keepers, and a support slidably mounted in each of said support receiving members, each support being formed of resilient material having base members with divided legs coming together at the top and one leg continuing beyond the point of joinder, and forming a resilient locking member extending into the adjacent support receiving member and engageable with its keepers, each headed shank extending between the divided legs of the adjacent support and being frictionally held thereby.

3. A poultry feeder comprising a trough, a socket on each end of said trough having keepers, and a support for each end of the trough formed of resilient material bent to form feet and having divided legs joining each other at the top, one leg continuing beyond the point of joinder and being bent downwardly to form a resilient locking member having a stud on the end, the legs and locking member slidably mounted within the adjacent socket and engageable with its keepers.

4. A poultry feeder comprising a trough, a reel rotatably mounted on the top of said trough and having a boss at each end extending beyond the sides of the trough, each boss having a head and shank, the head being larger than the shank, a socket on each end of said trough and a support at each end of the trough formed of resilient material bent to form feet, and having divided legs adjoining each other at the top, one leg continuing beyond the point of joinder and being bent downwardly to form a resilient locking member having a stud on the end, the legs and locking member of each support being slidably mounted within the adjacent socket to dispose the stud for locking engagement with the keepers thereof, each boss extending between the divided legs of the adjacent support and being held frictionally thereby.

5. A poultry feeder comprising a trough, support receiving members on said trough, a support for each of said support receiving members comprising a base with divided resilient legs coming together at the top adapted to frictionally slide within said support receiving member, one leg extending beyond the point of joinder forming a resilient tongue, and interlocking means on said tongue and support receiving member interengaged through the sliding of said support within said support receiving member.

6. A poultry feeder comprising a trough having a tubular guide at the end, one side of said guide being formed with a linear series of adjusting holes longitudinally of said guide, and a support comprising a base with divided resilient legs frictionally slidable within said guide and a resilient tongue extending downwardly from the top of said legs cramped within said guide having an out-turned end biased against said guide in alignment with said series of holes and adapted to spring into any hole with which it may be brought into registry by the sliding of said support within said guide, said support being twistable within said guide when said tongue is in released position to move said angular end out of alignment with said series of holes whereby it may be prevented from engaging any hole or group of holes, while said support is being slid to bring the end of said tongue to the region of a selected hole.

PERRY S. MARTIN.